United States Patent
Tane et al.

(10) Patent No.: US 11,491,871 B2
(45) Date of Patent: Nov. 8, 2022

(54) AERIAL DISPLAY DEVICE

(71) Applicant: DENSO CORPORATION, Kariya (JP)

(72) Inventors: Seigo Tane, Kariya (JP); Satoru Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 861 days.

(21) Appl. No.: 16/296,295

(22) Filed: Mar. 8, 2019

(65) Prior Publication Data
US 2019/0232787 A1 Aug. 1, 2019

Related U.S. Application Data

(63) Continuation of application No. PCT/JP2017/028668, filed on Aug. 8, 2017.

(30) Foreign Application Priority Data

Sep. 14, 2016 (JP) .............................. JP2016-179790

(51) Int. Cl.
| | |
|---|---|
| *B60K 35/00* | (2006.01) |
| *B60R 11/02* | (2006.01) |
| *G01P 1/08* | (2006.01) |
| *G02B 30/35* | (2020.01) |
| *G02B 27/01* | (2006.01) |

(52) U.S. Cl.
CPC ............. *B60K 35/00* (2013.01); *B60R 11/02* (2013.01); *G01P 1/08* (2013.01); *G02B 27/0101* (2013.01); *G02B 30/35* (2020.01)

(58) Field of Classification Search
CPC ........... B60K 35/00; B60R 11/02; G01P 1/08; G02B 27/0101; G02B 30/35
See application file for complete search history.

(56) References Cited

U.S. PATENT DOCUMENTS 5,461,361 A * 10/1995 Moore .................... B60K 37/02
                                              340/980
5,861,993 A    1/1999 Shanks et al.
(Continued)

FOREIGN PATENT DOCUMENTS

JP         H09506717 A    6/1997
JP         2010190960 A   9/2010
(Continued)

*Primary Examiner* — Ibrahim A Khan
(74) *Attorney, Agent, or Firm* — Harness, Dickey & Pierce, P.L.C.

(57) ABSTRACT

An aerial display device is mounted on a vehicle and displays information toward a driver seated in a driver seat of the vehicle. The aerial display device includes a display panel and a reflector array. The display panel including a display surface that emits images as light, the display panel being orientated such that the display surface faces toward the driver seat, the display surface including a screen display area and an aerial display area located next to the screen display area. The aerial display area is located at the upper edge portion of the display surface in an installed orientation. The screen display area is a part of the display surface located below the aerial display area. The reflector array forms the light emitted from the aerial display area as an aerial display image in midair above to the aerial display area.

7 Claims, 4 Drawing Sheets

(56) References Cited

U.S. PATENT DOCUMENTS

| | | | |
|---|---|---|---|
| 8,305,295 B2* | 11/2012 | Lvovskiy | G02B 27/0101 345/1.3 |
| 9,452,678 B1* | 9/2016 | Boss | G06F 3/0482 |
| 2004/0239583 A1* | 12/2004 | Shelton | G02B 27/0149 345/7 |
| 2006/0284839 A1* | 12/2006 | Breed | B62D 1/046 345/156 |
| 2008/0158510 A1* | 7/2008 | Tant | G02B 27/01 353/14 |
| 2009/0231698 A1* | 9/2009 | Hashimoto | G02B 30/56 359/476 |
| 2010/0231860 A1 | 9/2010 | Maekawa | |
| 2010/0295670 A1* | 11/2010 | Sato | B62D 15/029 340/458 |
| 2011/0074657 A1* | 3/2011 | Sugiyama | G02B 27/0101 345/7 |
| 2011/0075267 A1* | 3/2011 | Sugiyama | G02B 5/124 359/630 |
| 2012/0140325 A1 | 6/2012 | Sugiyama et al. | |
| 2014/0362448 A1* | 12/2014 | Yamada | G02B 27/0101 359/631 |
| 2015/0070319 A1* | 3/2015 | Pryor | G06F 3/042 345/175 |
| 2015/0245017 A1* | 8/2015 | Di Censo | H04N 13/327 348/51 |
| 2016/0033776 A1 | 2/2016 | Otsubo | |
| 2016/0116977 A1* | 4/2016 | Goldman-Shenhar | B60K 37/06 345/156 |
| 2016/0196098 A1* | 7/2016 | Roth | G09G 5/00 715/761 |
| 2017/0043712 A1* | 2/2017 | Paszkowicz | B60Q 3/80 |
| 2017/0146705 A1 | 5/2017 | Otsubo | |
| 2018/0011313 A1* | 1/2018 | Nahman | B60K 35/00 |
| 2018/0126903 A1* | 5/2018 | Herrmann | G06T 3/0018 |

FOREIGN PATENT DOCUMENTS

| | | |
|---|---|---|
| JP | 2010224292 A | 10/2010 |
| JP | 4900618 B2 | 3/2012 |
| JP | 5466793 B1 | 4/2014 |
| JP | 5614745 B2 | 10/2014 |
| JP | 5820955 B1 | 11/2015 |

* cited by examiner

AERIAL DISPLAY DEVICE

CROSS REFERENCE TO RELATED APPLICATIONS

The present application is a continuation application of International Patent Application No. PCT/JP2017/028668 filed on Aug. 8, 2017, which designated the United States and claims the benefit of priority from Japanese Patent Application No. 2016-179790 filed on Sep. 14, 2016. The entire disclosures of all of the above applications are incorporated herein by reference.

TECHNICAL FIELD

The present disclosure relates to an aerial display device mounted on a vehicle.

BACKGROUND

A display device including an aerial imaging element, such as those included in vehicle dashboards, may display an image in midair. In such cases, it may be desirable to maintain good forward visibility for a driver of the vehicle, while at the same time present information in a pleasant manner.

SUMMARY

In one aspect of the present disclosure, an aerial display device for mounting on a vehicle is configured to display information toward a driver seated in a driver seat of the vehicle. The aerial display device may include a display panel including a display surface that emits images as light, the display panel being orientated such that the display surface faces toward the driver seat, the display surface including a screen display area and an aerial display area located next to the screen display area, and an aerial imaging element that forms the light emitted from the aerial display area as an aerial display image in midair next to the aerial display area.

DETAILED DESCRIPTION

Figure 1:
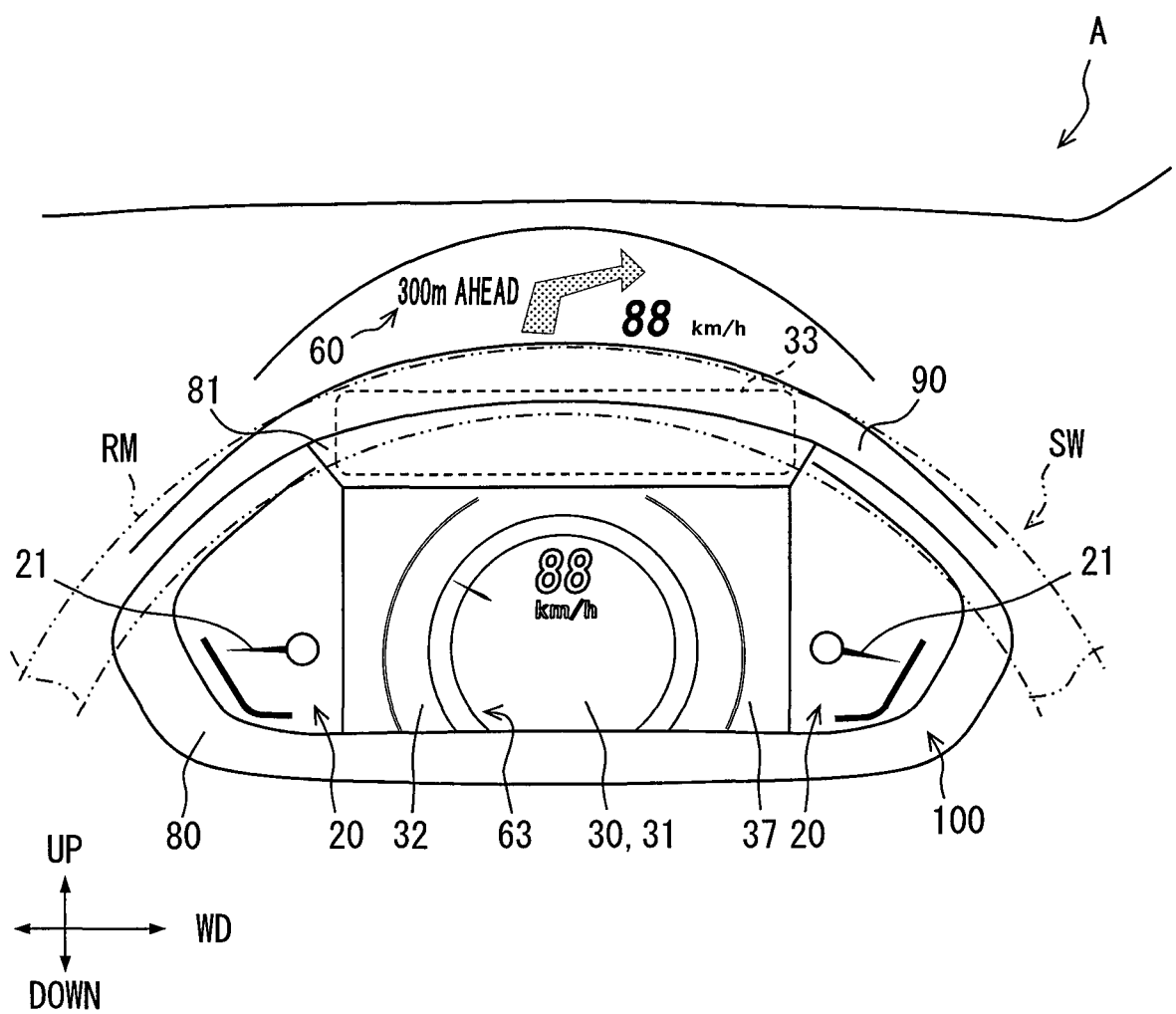
FIG. 1 is a front view showing each display of an aerial display device.
Figure 2:
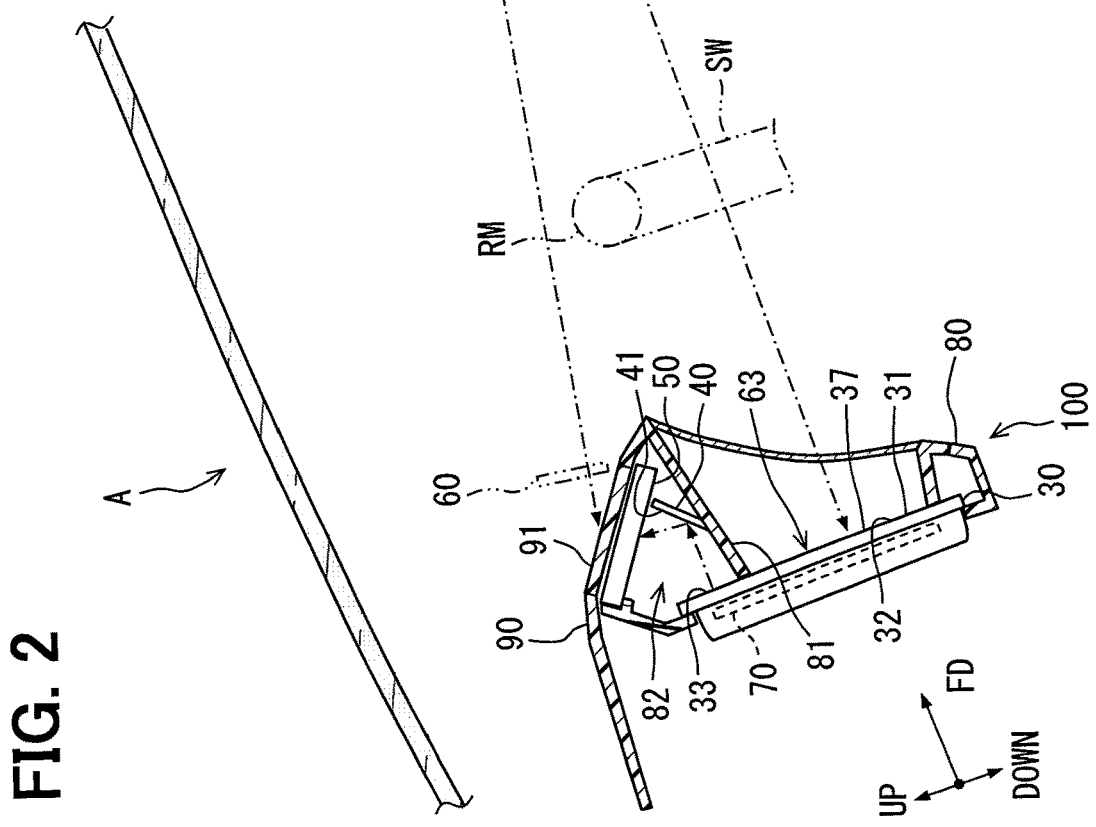
FIG. 2 is a cross-sectional view showing a mechanical configuration of the aerial display device.

As shown in FIGS. 1 and 2, an aerial display device 100 according to one embodiment of the present disclosure is mounted in front of a driver seat in a vehicle A and functions as a combination meter. The aerial display device 100 presents information related to the vehicle A to a driver D using a screen display image 63 drawn in a screen display area 32, pointer displays in pointer display areas 20 provided on both sides of the screen display area 32, and an aerial display image 60 imaged above the screen display area 32.

In the aerial display device 100, as an example, information such as the traveling speed of the vehicle A, the remaining amount of fuel, route guidance or the like may be displayed. Further, if the vehicle A is equipped with automatic driving functions, during the period in which the automatic driving function is in operation, the aerial display device 100 may display entertainment media for the driver D who is substantially not performing driving operations.

A steering wheel SW is positioned between the aerial display device 100 and the driver seat. The driver D seated appropriately in the driver seat looks past the steering wheel SW to visually recognize indications by the aerial display device 100 behind the steering wheel SW. In the forward field of vision of the driver D, the screen display area 32 and the pointer display areas 20 are located on the inner peripheral side of a rim portion RM of the steering wheel SW. On the other hand, the aerial display image 60 is located on the outer peripheral side of the rim portion RM and is located above the rim portion RM. The range of viewpoint positions in which the eyes of the driver D can be located (see the two-dot dashed lines in FIG. 1) is set based on the driver D having a presumed physique sitting in the driver seat.

The aerial display device 100 includes a display panel 30, a reflecting mirror 40, a reflector array 50, a housing 80, a hood member 90, a display control circuit 70, and the like.

The display panel 30 is a liquid crystal display formed as a rectangular flat plate as a whole. The display panel 30 includes a liquid crystal display 37 which forms a display surface 31, and a backlight 38 that illuminates from the rear side of the liquid crystal display 37 (see FIG. 5). The display panel 30 is retained in the housing 80 such that the display panel 30 is installed with the display surface 31 facing the driver seat side. In the following description, a front direction FD refers to the direction that the display surface 31 faces, i.e., the direction along an imaginary axis substantially orthogonal to the display surface 31. Further, the direction along the short side of the display panel 30 is defined as an up-down direction, and the direction along the long side of the display panel 30 is defined as a width direction WD.

In the display surface 31, a large number of pixels are two-dimensionally arranged. In each pixel, red, green, and blue subpixels are provided. The display panel 30 is able to display various images on the display surface 31 in color by controlling the light transmittance of the subpixels. The display panel 30 includes the screen display area 32 and an aerial display area 33 on the display surface 31.

The screen display area 32, when installed in the vehicle A, is an area of the display surface 31 located below the aerial display area 33. As shown in FIG. 1, the screen display area 32 is partitioned into a horizontally elongated rectangular shape. The screen display area 32 is exposed from the housing 80 and is visible to the driver D. The area of the screen display area 32 is larger than that of the aerial display area 33. In the screen display area 32, a design of the screen display image 63 is displayed as emitted light. For example, in FIG. 1, a pointer and a digital speed display are displayed.

The aerial display area 33 is located next to the screen display area 32. The aerial display area 33 of the present embodiment, when installed in the vehicle A, is defined above the screen display area 32 among the top, bottom, left, and right sides of the screen display area 32, and is located at the upper edge portion of the display surface 31. The aerial display area 33 is partitioned into a horizontally elongated rectangular shape. The dimension of the aerial display area 33 in the up-down direction is shorter than that of the screen display area 32. The aerial display area 33 is disposed in the housing 80 and is not exposed from the housing 80. The aerial display area 33 emits the light of the image formed as the aerial display image 60 toward the front direction FD.

The reflecting mirror 40 is a flat plate-shaped mirror member in which a metal such as aluminum or nickel is vapor-deposited on a base material such as glass. A reflecting surface 41 is formed on one of the two surfaces of the reflecting mirror 40. The reflecting surface 41 is formed in a horizontally elongated rectangular shape. The reflecting mirror 40 is arranged toward the front direction FD from the aerial display area 33 in an orientation in which the longitudinal direction of the reflecting surface 41 is along the width direction WD. The dimension of the reflecting surface 41 in the longitudinal direction is set to be equal to or larger than the dimension of the aerial display area 33 in the width direction WD. The reflecting mirror 40 is positioned below the reflector array 50 and is fixed to the housing 80 in an orientation in which the reflecting surface 41, which faces the aerial display area 33, is inclined upward about 45 degrees with respect to the display surface 31. Due to such an orientation, the reflecting mirror 40 reflects the light of the image emitted from the aerial display area 33 toward the upper reflector array 50.

Figure 3:
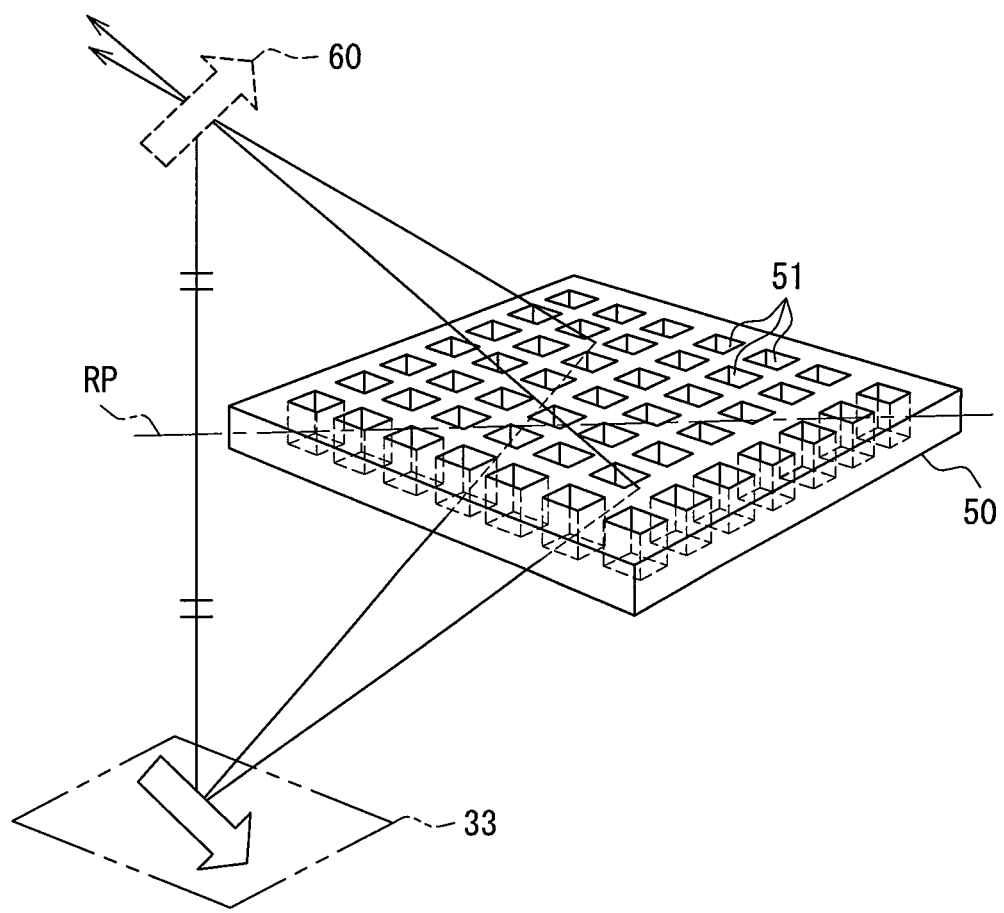
FIG. 3 is a schematic diagram showing an exaggerated view of a plurality of unit optical elements formed in a reflector array.
Figure 4:
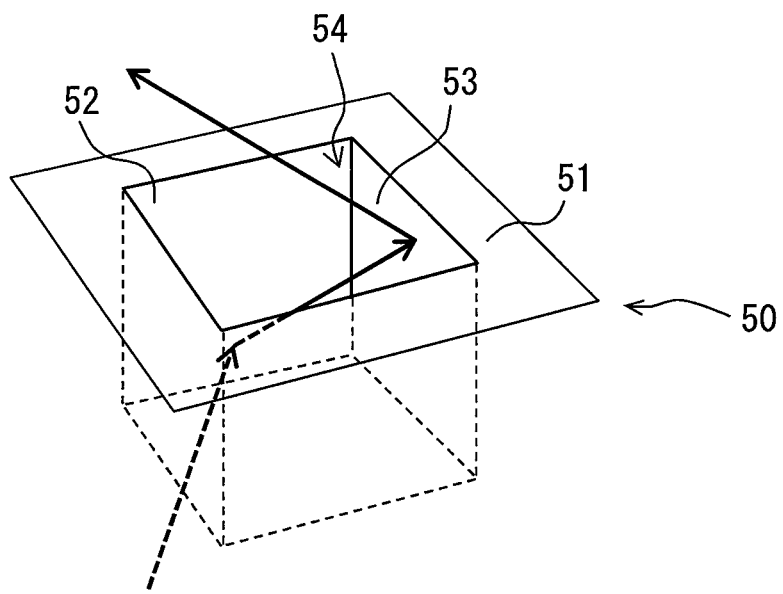
FIG. 4 is a diagram schematically showing the manner in which light is reflected by one unit optical element.

The reflector array 50 is formed in a rectangular plate shape as a whole. The reflector array 50 is positioned above the reflecting mirror 40 and toward the front direction FD of the aerial display area 33. Similar to the reflecting mirror 40, the reflector array 50 is orientated with a longitudinal direction along the width direction. The reflector array 50 is fixed to the housing 80 in an orientation inclined downward toward the front direction FD. As shown in FIG. 2 to FIG. 4, the reflector array 50 is an aerial imaging element that forms, in midair, an image with the light emitted from the aerial display area 33 and reflected by the reflective surface 41. A reference plane RP of the reflector array 50 is located between the aerial display image 60 formed by the reflector array 50 and the aerial display area 33, which acts as the light source.

The reflector array 50 is made up of a dihedral corner reflector array in which light is finely divided by a large number of discretely arranged unit optical elements 51, and the divided light is geometrically optically gathered at a specific imaging position. The individual unit optical elements 51 are arranged two-dimensionally with a predetermined pitch along the planar direction of the reflector array 50.

It should be noted that the unit optical elements 51 shown in FIGS. 3 and 4 are exaggerated in size for ease of understanding. Further, a virtual plane passing through the center of the reflector array 50 in the plate thickness direction and parallel to the planar direction of the reflector array 50 is defined as the reference plane RP of the reflector array 50. The reference plane RP in FIG. 3 is schematically indicated by an alternate long and short dashed line.

At least two mirror surfaces 52 and 53, which are adjacent to each other and orientated perpendicular to each other, are formed in each unit optical element 51. Each mirror surface 52, 53 is formed in a planar shape and oriented perpendicular to the reference plane RP. In order to form such mirror surfaces 52, 53, the reflector array 50 may, for example, be a base material formed of glass or a light-transmitting resin material configured to have a large number of fine through holes 54.

Each through hole 54 is a square hole defined by four side wall surfaces. Each through hole 54 can transmit light in the plate thickness direction of the reflector array 50. At least two adjacent sides among the plurality of side wall surfaces form the mirror surfaces 52, 53 by vapor deposition of aluminum or nickel. The other two side wall surfaces may be mirror surfaces or non-reflective.

One edge of one unit optical element 51 may, for example, be about 50 to 1000 μm, and is preferably about 100 μm. The thickness of the base material of the reflector array 50 is about 50 to 1000 μm, and preferably about 100 μm. With such dimensions, the mirror surfaces 52, 53 of the present embodiment are formed in a square shape.

In the reflector array 50 having the above structure, light incident from one side of the reference plane RP is emitted to the other side through the unit optical elements 51. When passing through each unit optical element 51, the light incident on the reflector array 50 is sequentially reflected in order, one by one, on two mirror surfaces 52, 53. The light, having passed through the unit optical elements 51, gathers at a position which is optically plane symmetrical with respect to the reference plane RP, and is imaged as a real mirror image (aerial display image 60). According to the above described arrangement and orientation of the reflecting mirror 40 and the reflector array 50 with respect to the aerial display area 33, the aerial display image 60 is located above the aerial display area 33 and toward the front direction FD with respect to the reflector array 50. When the driver D views the aerial display image 60 from the reflector array 50 with both eyes, the aerial display image 60 is a three dimensional image with left-right parallax. In addition, the driver D perceives the aerial display image 60 on the far side of the optical imaging position (see FIG. 2).

The housing 80 shown in FIGS. 1 and 2 is formed of a light-blocking resin material. The housing 80 accommodates the display panel 30, the reflecting mirror 40, and the reflector array 50, and retains these elements. In the housing 80, a facing portion 81 and a housing space 82 are formed. The facing portion 81 extends in a plate shape along a boundary dividing the screen display area 32 and the aerial display area 33. The housing space 82 is a space partitioned toward the front direction FD from the aerial display area 33 above the screen display area 32 and accommodates the reflecting mirror 40 and the reflector array 50.

The hood member 90 is formed of a light-transmitting resin material in a curved plate shape. The hood member 90 has a dark color such as black or dark gray as a whole. The hood member 90 defines the housing space 82 together with the housing 80 and covers an exit surface side of the reflector array 50 from above. A transmissive portion 91 is provided in a region of the hood member 90 facing the exit surface of the reflector array 50. A transparent coating such as tinting is applied to the inner surface of the transmissive portion 91. Through such coating, the transmissive portion 91 is a dark region that transmits the light emitted from the reflector array 50 while hiding the reflector array 50. By being covered with the transmissive portion 91, it is difficult for the driver D to visually recognize the reflector array 50. Light-shielding painting is applied to the hood member 90 aside from the transmissive portion 91. Due to such a coating, the texture of the outer surface of the hood member 90 is matched to the texture of the outer surface of the instrument panel.

Figure 5:
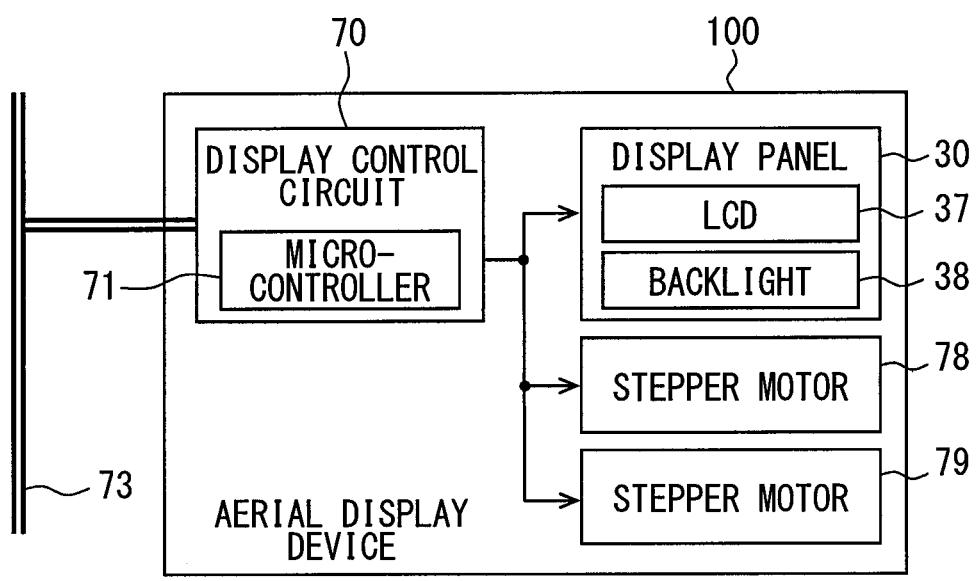
FIG. 5 is a block diagram showing the electrical configuration of the aerial display device.

The display control circuit 70 shown in FIGS. 2 and 5 is an electronic circuit composed mainly of a microcontroller 71 having a processor, a RAM, a storage medium, and the like. The display control circuit 70 is communicably connected to a communication bus 73 mounted in the vehicle A. In addition, the display control circuit 70 is electrically connected to the display panel 30 and two stepper motors 78, 79 for driving the pointers 21 (see FIG. 1). The display control circuit 70 controls each display rendered in the screen display area 32 and the aerial display area 33 and controls the driving of the stepper motors 78 and 79 based on the information on the vehicle A acquired from the communication bus 73.

In the aerial display device 100 described so far, both the screen display image 63 on the screen display area 32 and the aerial display image 60 formed in midair are displayed in front of the driver D. As a comparative example, consider a display device in which the entire display is suspended in midair. In this case, the driver may feel uncomfortable because only a midair display is visible.

In contrast, according to the aerial display device 100 of the present disclosure, both the aerial display image 60 and also the screen display image 63 are visually recognized by the driver D, such that any discomfort caused by the display can be reduced as compared with displaying only the aerial display image.

As shown in FIGS. 1 and 2, the display panel 30 of the aerial display device 100 is installed so that the screen display area 32 is positioned on the inner circumferential side of the rim portion RM as viewed from the driver D. As a result, the aerial display area 33 is located in a range hidden by the rim portion RM as viewed from the driver D. The light emitted from such an aerial display area 33 is reflected by the reflecting mirror 40 and is formed by the reflector array 50 as an aerial display image 60 in midair above the aerial display area 33. Due to this, the aerial display image 60 is not hidden by the rim portion RM and can be visually recognized by the driver D in the same manner as the screen display image 63 displayed in the screen display area 32.

In addition, when the aerial display image 60 is imaged in midair using the reflector array 50, there is no shielding member on the outer circumference side of the rim portion RM when viewed from the driver D. Such a shielding member would obstruct the frontal vision of the driver D. Therefore, it is possible to present information to the driver D effectively utilizing the display surface 31 of the display panel 30, while favorably maintaining the forward visibility of the driver D.

In addition, in the present embodiment, the reflecting mirror 40 for reflecting the light emitted from the aerial display area 33 is provided between the aerial display area 33 and the reflector array 50. With such a configuration, the light emitted from the aerial display area 33 can be appropriately formed at a position not overlapping with the rim portion RM.

Further, when the reflecting mirror 40 reflects light upwardly as in the present embodiment, the installation orientation of the reflector array 50 can be set close to horizontal. According to the above, the housing space 82 can be made small in the vertical direction. As a result, it is possible to avoid a situation where the housing space 82 protrudes out upward. Therefore, even when the optical system for displaying the aerial display image 60 is provided, good forward visibility is maintained for the driver D.

Furthermore, in this embodiment, the image forming position of the aerial display image 60 is set toward the front direction FD with respect to the reflector array 50. As a result, the outer surface of the dark hood member 90 becomes the background of the aerial display image 60 when viewed from the driver D. According to the above, a high contrast is maintained between the aerial display image 60 and the background. As a result, the driver D can visually recognize a clear aerial display image 60.

In addition, the reflector array 50 according to the present embodiment is hidden from the driver D by being covered with the dark hood member 90. With such a configuration, it is unlikely for the upper portion of the aerial display device 100 to show an unnatural design even in a display off state in which the aerial display image 60 is not displayed.

In addition, due to the shape of the steering wheel SW, the range of the display surface 31 hidden by the rim portion RM tends to be horizontally long. Therefore, the aerial display area 33 of the present embodiment is defined horizontally at the upper edge portion of the display surface 31. Due to the aerial display area 33 having this shape, the range of the display surface 31, which is easily hidden by the rim portion RM, is reliably and effectively used as the area for displaying the aerial display image 60.

Further, in this embodiment, the reflector array 50 corresponds to an "aerial imaging element", and the hood member 90 corresponds to a "transmissive member".

Other Embodiments

Although one embodiment of the present disclosure has been described above, the present disclosure is not construed as being limited to the above-mentioned embodiments, and can be applied to various embodiments and combinations within a scope that does not depart from the gist of the present disclosure.

In the above embodiment, by positioning the aerial display area at the upper edge portion of the display surface and positioning the screen display area at the lower side of the aerial display area, the aerial display image is formed in midair above the aerial display area. However, the imaging position of the aerial display image is not limited to the space above the aerial display device as described above. As one example, the aerial display area may be positioned on the left or right side of the screen display area, for example located on the left side of the screen display area so as to be adjacent to the screen display area. In addition, it is of course possible that the aerial display image is formed in midair on the left side of the screen display area (in the space on the passenger seat side) with a configuration in which the reflector array is provided so as to face the aerial display area. Further, the aerial display area may be defined to the side or lower right side of the screen display area. In addition, a plurality of aerial display areas may be provided adjacent to the screen display area.

Further, the aerial display image need not always be displayed simultaneously with the screen display area. The aerial display image may be displayed at necessary timings for the driver, instead of always being displayed simultaneously with general displays during operation such as a general display displayed in the screen display area, a speedometer, a tachometer, a fuel gauge, a thermometer, etc. For example, at the time of vehicle operation, the position information of another vehicle approaching to the rear or side of the vehicle may be displayed as an aerial display image. Further, the display contents of the aerial display image may also include content relating to security and safety.

In the above embodiment, one reflecting mirror is provided between the aerial display area and the reflector array. However, the configuration of the optical system provided between the aerial display area and the reflector array can be appropriately changed. For example, the aerial display device may have a configuration in which the light emitted from the aerial display area is directly incident on the incident surface of the reflector array. Further, a plurality of reflecting mirrors (for example, three) may be provided in the optical path from the aerial display area to the reflector array.

Specifically, the first reflecting mirror reflects the light emitted toward the front direction FD from the aerial display area upwards. The second reflecting mirror reflects the light reflected upward by the first reflecting mirror toward the rear side (front of the vehicle). The third reflecting mirror reflects the light reflected by the second reflecting mirror toward the upper reflector array again. With the above configuration, since the imaging position of the aerial display image is further away from the driver D, there is less strain on the driver D due to change in focal length when moving their line of sight from the foreground to the aerial display image.

The reflector array of the above embodiment has a configuration in which mirror surfaces are formed on two side wall surfaces of each through hole. However, the configuration of the reflector array may be changed appropriately as long as it can form a large number of unit optical elements each having two perpendicular mirror surfaces. For example, the reflector array may have a configuration in which a transparent quadrangular prism-shaped protrusion is a unit optical element and a large number of protrusions are two-dimensionally arranged. In such a configuration, two adjacent ones of the four side wall surfaces of the protrusion are mirror surfaces. Further, the two mirror surfaces formed in each unit optical element may be arranged so as to be shifted in the thickness direction. In addition, the through holes forming the two mirror surfaces may not physically penetrate as long as they can transmit light.

The aerial display image of the above embodiment is imaged toward the front direction FD from the reflector array. However, the imaging position of the aerial display image may be appropriately adjusted by changing the positions and orientations of the optical system, such as the reflecting mirror and the reflector array, relative to the aerial display area.

In the above embodiment, the hood member covering the reflector array is provided. However, a structure corresponding to the hood member may be omitted such that the surface of the reflector array on the exit side is visibly exposed to the driver D. Further, the hood member is may be, for example, a member forming the instrument panel or a part of the instrument panel, rather than being included in the configuration of the aerial display device.

The aerial display area of the above embodiment is formed horizontally with the width direction WD as its longitudinal direction. However, the shape of the aerial display area may be changed as appropriate. In addition, a plurality of aerial display areas may be defined in the upper edge portion of the display surface. For example, one aerial display area may be formed on each of the left and right corner portions of the upper edge portion which is easily hidden by the rim portion RM. Furthermore, the screen display area and the aerial display area need not be rectangular. For example, the center of the upper edge of the screen display area may be have upwardly convex curved shape corresponding to the shape of the inner peripheral side of the rim portion RM.

Further, the configuration and shape of the display panel can be appropriately changed. For example, the display panel may have a configuration using a different type of liquid crystal display that is not rectangular. Further, the configuration for forming the display surface is not limited to a liquid crystal display. For example, the display panel may be an organic EL (electroluminescence) display. Further, the display surface need not be planar. The display surface may be curved so as to be further from the driver D or approach the driver D toward the both sides in the width direction WD. According to the curvature of the display surface, the aerial display image also has a stereoscopic display mode.

The invention claimed is:

1. An aerial display device, mounted on a vehicle, that displays information toward a driver seated in a driver seat of the vehicle, comprising:
   a display panel including a display surface that emits images as light, the display panel being orientated such that the display surface faces toward the driver seat, the display surface including a screen display area and an aerial display area located next to the screen display area;
   an aerial imaging element that forms the light emitted from the aerial display area as an aerial display image in midair next to the aerial display area; and
   a reflecting mirror that reflects the light emitted from the aerial display area toward the aerial imaging element, wherein
   the reflecting mirror reflects the light emitted from the aerial display area upward, and
   the display surface faces the aerial imaging element in a front direction, and the aerial imaging element is positioned above the reflecting mirror and images the aerial display image toward the front direction.

2. The aerial display device of claim 1, wherein
   the aerial display area is located at an upper edge portion of the display surface in an installed orientation,
   the screen display area is located below the aerial display area, and
   the aerial imaging element is arranged so as to form the aerial display image in midair above the aerial display area.

3. The aerial display device of claim 1, further comprising:
   a dark color transmissive member that covers the aerial imaging element to conceal the aerial imaging element from the driver seat side and that transmits the light emitted from the aerial imaging element.

4. The aerial display device of claim 2, wherein
   the aerial display area is defined horizontally at an upper edge portion of the display surface, and
   the aerial imaging element images the aerial display image in a horizontally elongated manner by imaging the light emitted from the aerial display area.

5. The aerial display device of claim 2, wherein
   the aerial display area is defined to include a region of the display surface which is hidden by a steering wheel of the vehicle when viewed from the driver.

6. An aerial display device for mounting in a vehicle, comprising:
   a display panel including a display surface that emits images as light, the display surface being divided into a screen display area and an aerial display area located next to each other;
   a reflector array arranged to receive the light emitted from the aerial display area, the reflector array including a plurality of reflective mirror elements that form the light received from the aerial display area as an aerial display image in midair next to the aerial display area, and
   a reflecting mirror that reflects the light emitted from the aerial display area toward the reflector array, wherein
   the reflecting mirror reflects the light emitted from the aerial display area upward, and the display surface faces the reflector array in a front direction, and the reflector array is positioned above the reflecting mirror and images the aerial display image toward the front direction.

7. A vehicular aerial display system for a vehicle, comprising:
a vehicular dashboard;
the aerial display device of claim 6 mounted in the vehicular dashboard and oriented such that the display panel faces a rear direction of the vehicle; and
a steering wheel attached to the vehicular dashboard, the steering wheel including a rim portion, wherein
when the aerial display device is viewed from the rear direction of the vehicle:
the rim portion of the steering wheel is disposed in front of the aerial display area of the display panel,
the aerial display area is disposed above the rim portion of the steering wheel, and
the screen display area is disposed below the rim portion of the steering wheel.

* * * * *